(12) United States Patent
Nakamura et al.

(10) Patent No.: US 12,403,778 B2
(45) Date of Patent: Sep. 2, 2025

(54) TRACTOR AND VEHICLE EQUIPPED WITH TRACTOR

(71) Applicant: TOYOTA JIDOSHA KABUSHIKI KAISHA, Toyota (JP)

(72) Inventors: Nobuo Nakamura, Nagoya (JP); Hiroyuki Kobayashi, Mitaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 483 days.

(21) Appl. No.: 17/897,653

(22) Filed: Aug. 29, 2022

(65) Prior Publication Data

US 2023/0112240 A1 Apr. 13, 2023

(30) Foreign Application Priority Data

Oct. 8, 2021 (JP) .................................. 2021-166467

(51) Int. Cl.
| | | |
|---|---|---|
| *B60L 50/70* | (2019.01) | |
| *B60W 60/00* | (2020.01) | |
| *B62D 53/02* | (2006.01) | |

(52) U.S. Cl.
CPC ........... *B60L 50/70* (2019.02); *B60W 60/001* (2020.02); *B62D 53/02* (2013.01)

(58) Field of Classification Search
CPC ......... B62D 53/02; B62D 53/04; B60L 50/70; B60L 50/71; B60L 50/72; B60L 50/75; B60K 2015/03315
See application file for complete search history.

(56) References Cited

U.S. PATENT DOCUMENTS

| | | | | |
|---|---|---|---|---|
| 6,722,460 | B2 * | 4/2004 | Yang ........................ | B62M 7/12 180/65.245 |
| 7,252,166 | B2 * | 8/2007 | Kubusch ................ | B60K 15/03 180/65.1 |
| 9,829,882 | B2 * | 11/2017 | MacGregor ............ | B62D 61/00 |
| 10,538,190 | B1 * | 1/2020 | Metellus .................. | B60F 5/02 |
| 11,597,454 | B2 * | 3/2023 | Kaneko .................... | B60P 3/40 |
| 11,707,955 | B2 * | 7/2023 | Smith ....................... | B60D 1/62 701/28 |
| 2012/0193154 | A1 * | 8/2012 | Wellborn .............. | B60W 10/20 180/14.2 |
| 2015/0367885 | A1 * | 12/2015 | Bruns .................. | B62D 5/0421 280/408 |

(Continued)

FOREIGN PATENT DOCUMENTS

| | | | | |
|---|---|---|---|---|
| CN | 113246751 | A * | 8/2021 | ............. B60K 15/07 |
| JP | 2020-125090 | A | 8/2020 | |

OTHER PUBLICATIONS

Translation of CN-113246751-A (Year: 2021).*

*Primary Examiner* — Katy M Ebner (74) *Attorney, Agent, or Firm* — Dinsmore & Shohl LLP (57) ABSTRACT

A tractor that includes: a driver equipped with a left and right pair of driving wheels; a vehicle main body provided between the left and right pair of driving wheels; a periphery information detection sensor provided at the vehicle main body and detecting periphery information; a controller provided in the vehicle main body and controlling autonomous traveling by the driver in accordance with the periphery information detected by the periphery information detection sensor; and a first coupler provided at the vehicle main body and configured to be coupled to a trailer.

8 Claims, 7 Drawing Sheets

(56) References Cited

U.S. PATENT DOCUMENTS

| | | | |
|---|---|---|---|
| 2019/0033856 A1* | 1/2019 | Ferguson | G06K 19/0723 |
| 2019/0210479 A1* | 7/2019 | Bachmann | B60L 15/38 |
| 2019/0232849 A1* | 8/2019 | Kaneko | B60P 1/003 |
| 2019/0315236 A1* | 10/2019 | Mere | H02J 7/342 |
| 2019/0318306 A1* | 10/2019 | Mere | G06V 20/56 |
| 2022/0118977 A1 | 4/2022 | Shimbo et al. | |
| 2022/0402354 A1* | 12/2022 | Wang | H01M 50/249 |
| 2022/0410701 A1* | 12/2022 | Mei | B60K 15/07 |
| 2023/0115169 A1* | 4/2023 | Mei | B60K 15/063 |
| | | | 280/830 |
| 2024/0149961 A1* | 5/2024 | Stout | B60R 1/26 |
| 2024/0278607 A1* | 8/2024 | Rayner | B60D 1/665 |
| 2024/0286647 A1* | 8/2024 | Nakamura | B60L 50/60 |
| 2024/0359554 A1* | 10/2024 | Hornback | B60K 15/067 |
| 2024/0408977 A1* | 12/2024 | Yhr | B60L 53/57 |

\* cited by examiner

TRACTOR AND VEHICLE EQUIPPED WITH TRACTOR

CROSS-REFERENCE TO RELATED APPLICATION

This application is based on and claims priority under 35 USC 119 from Japanese Patent Application No. 2021-166467 filed on Oct. 8, 2021, the disclosure of which is incorporated by reference herein.

BACKGROUND

Technical Field

The present disclosure relates to a tractor and to a vehicle equipped with a tractor.

Related Art

Japanese Patent Application Laid-Open (JP-A) No. 2020-125090 discloses a towing vehicle (a tractor) that is equipped with autonomous driving functions.

The related technology mentioned above has scope for improvement in regard to a tractor that tows a trailer by autonomous running becoming more compact.

SUMMARY

An aspect of the present disclosure is a tractor that includes: a driver equipped with a left and right pair of driving wheels; a vehicle main body provided between the left and right pair of driving wheels; a periphery information detection sensor provided at the vehicle main body and detecting periphery information; a controller provided in the vehicle main body and controlling autonomous traveling by the driver in accordance with the periphery information detected by the periphery information detection sensor; and a first coupler provided at the vehicle main body and configured to be coupled to a trailer.

DETAILED DESCRIPTION

First Exemplary Embodiment

A tractor according to a first exemplary embodiment of the present disclosure and a vehicle that is equipped with the tractor are described using FIG. 1 to FIG. 6. An arrow FR that is shown as appropriate in these drawings indicates a vehicle front side, an arrow UP indicates a vehicle upper side, and an arrow W indicates a vehicle width direction.

Figure 1:
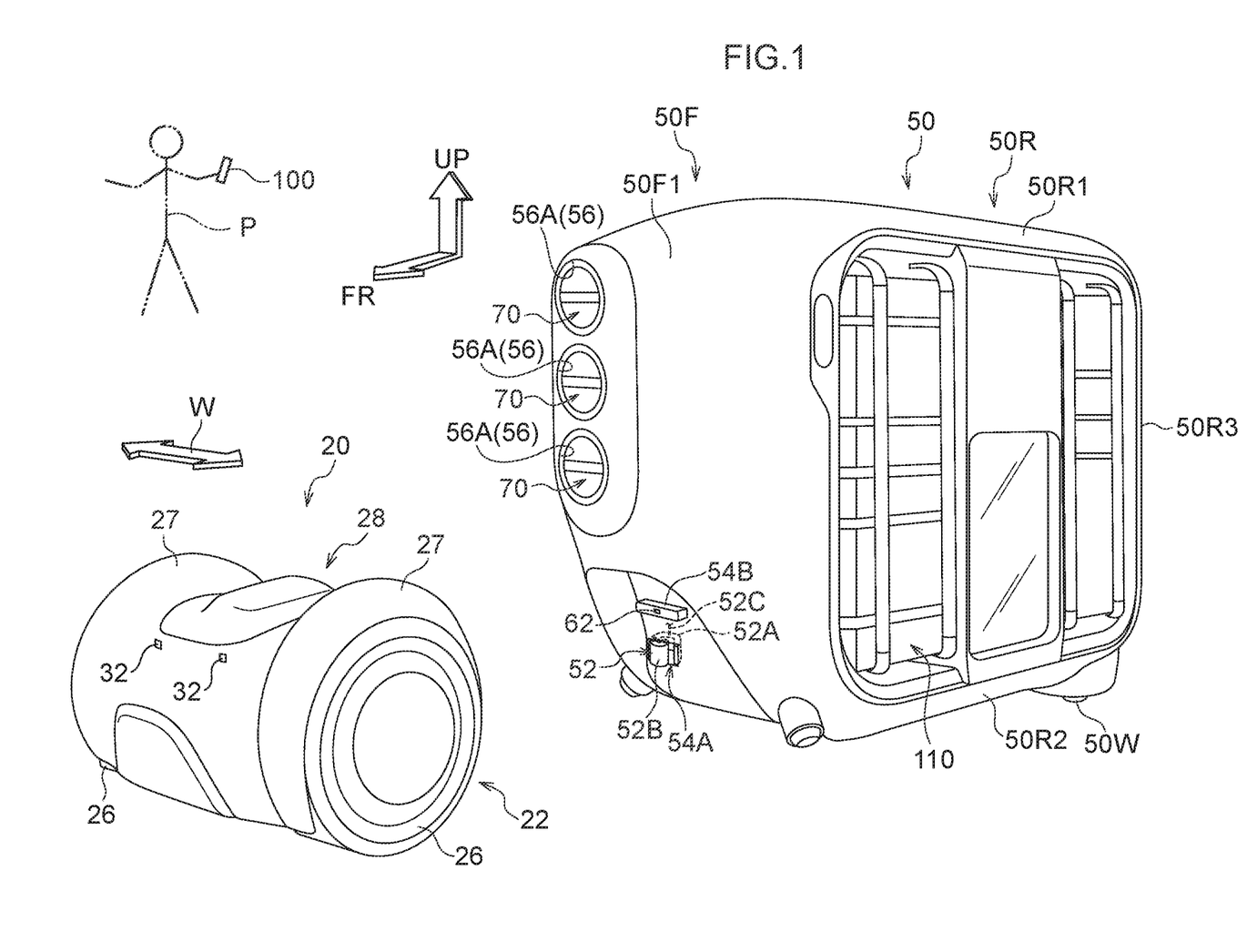
FIG. 1 is a perspective view, seen from a diagonal forward side, showing an exemplary tractor according to a first exemplary embodiment of the present disclosure and a trailer to be towed by the tractor, in a state in which the tractor and trailer are uncoupled.
Figure 2:
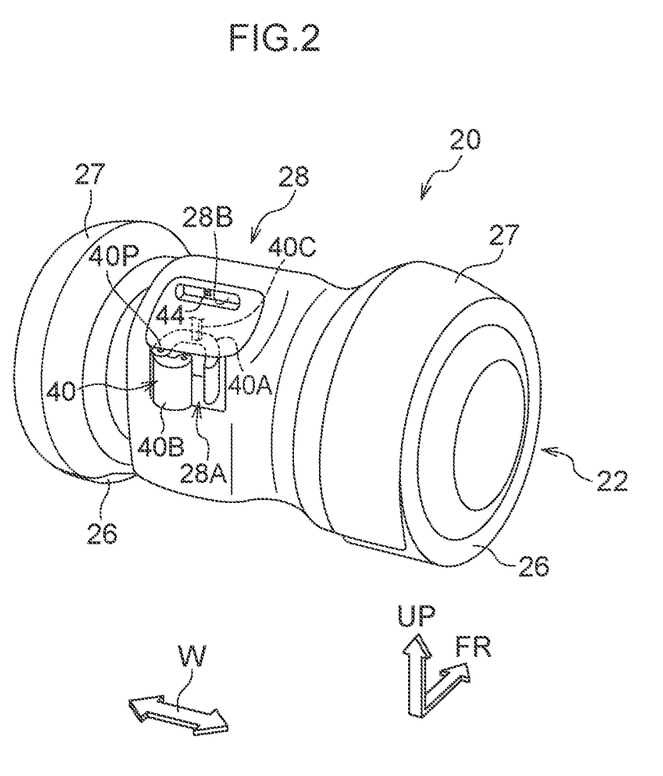
FIG. 2 is a perspective view, seen from a diagonal rearward side, showing the exemplary tractor in FIG. 1.

FIG. 1 is a perspective view, seen from a diagonal forward side, showing a tractor 20 according to the first exemplary embodiment and a trailer 50 to be towed by the tractor 20, in a state in which the tractor 20 and trailer 50 are uncoupled. FIG. 2 is a perspective view, seen from a diagonal rearward side, showing the tractor 20. The tractor 20 according to the present exemplary embodiment may be given predetermined operation commands from, for example, a portable device 100 of a user P shown in FIG. 1 or the like. The portable device 100, includes, for example, a liquid crystal display equipped with a touch panel that enables touch operations by the user P. The tractor 20 is capable of, for example wireless communications with a server via a network.

As shown in FIG. 1 and FIG. 2, the tractor 20 is equipped with a left and right pair of driving wheels 26. The left and right pair of driving wheels 26 constitute portions of a driver 22 for causing autonomous running of the tractor 20. A vehicle main body 28 is provided between the left and right pair of driving wheels 26. Fender portions 27 that cover peripheries of the driving wheels 26 are formed continuously from both vehicle width direction sides of the vehicle main body 28. As shown in FIG. 1, vicinity information detection sensors 32 that detect vicinity information are provided at the vehicle main body 28.

Figures 3A, 3B:
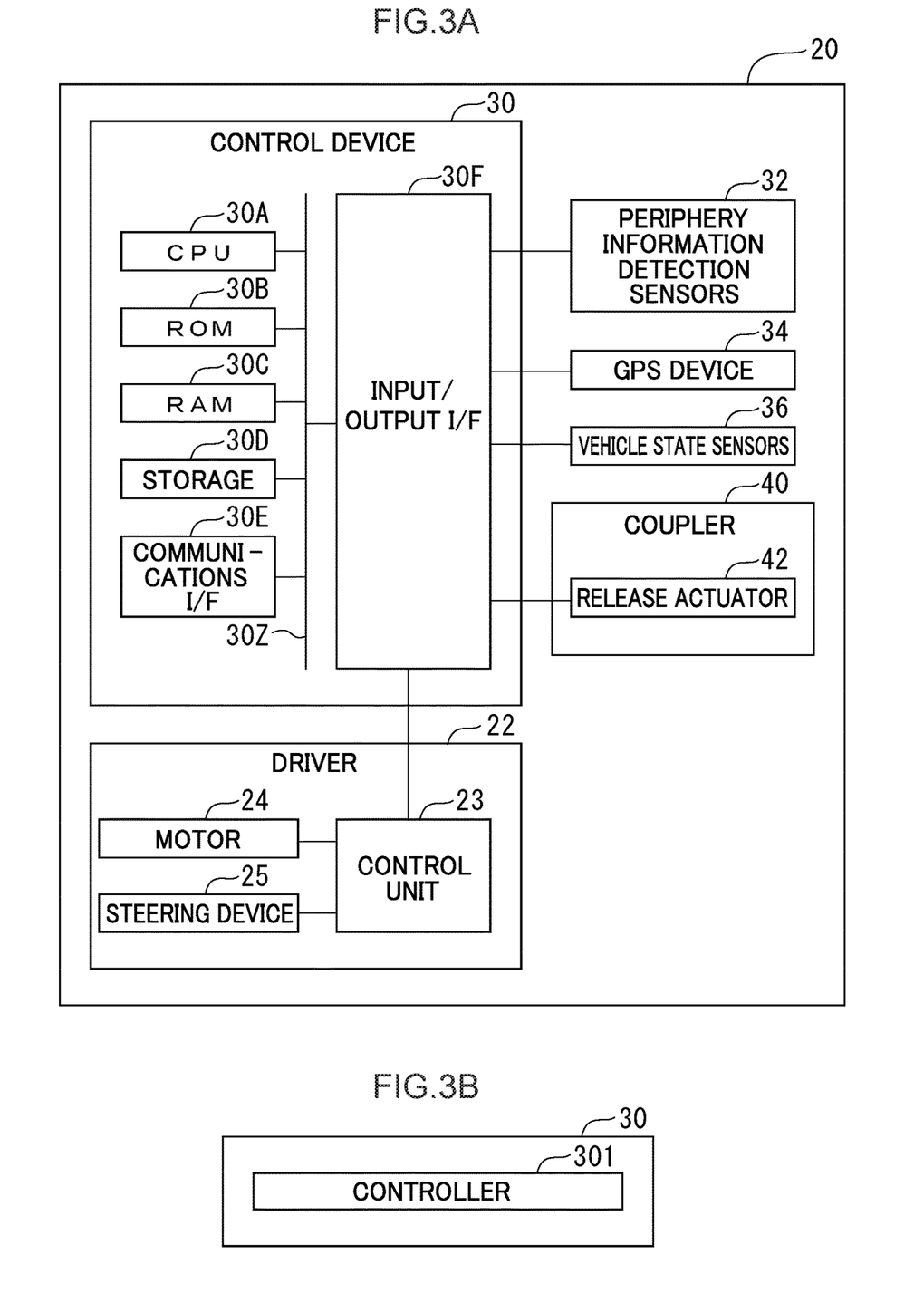
FIG. 3A is a block diagram showing some of exemplary hardware structures of the tractor in FIG. 1.
FIG. 3B is a block diagram showing an example of functional structures of a control device in FIG. 3A.

FIG. 3A shows some of hardware structures of the tractor 20 in a block diagram. The tractor 20 includes a battery. As shown in FIG. 3A, the tractor 20 includes the driver 22, a control device 30, the vicinity information detection sensors 32, a global positioning system (GPS) device 34, vehicle state sensors 36 and a coupler 40.

The control device 30 is provided in the vehicle main body 28 (see FIG. 1) and includes a central processing unit (CPU, or processor) 30A, which is an example of a hardware processor, read-only memory (ROM) 30B, which is an example of memory, random access memory (RAM) 30C, storage 30D, a communications interface 30E ("communications I/F" in FIG. 3A) and an input/output interface 30F ("input/output I/F" in FIG. 3A). The CPU 30A, ROM 30B, RAM 30C, storage 30D, communications interface 30E and input/output interface 30F are connected with one another to be capable of communications via a bus 30Z.

The CPU 30A is a central arithmetic processing unit that executes various programs and controls respective parts. That is, the CPU 30A reads a program from the ROM 30B or storage 30D and executes the program, using the RAM 30C as a work area. The CPU 30A performs control of the structures described above and various kinds of computational processing in accordance with programs recorded in the ROM 30B or storage 30D.

The ROM 30B stores various programs and various kinds of data. The RAM 30C serves as a work area and temporarily memorizes programs and data. The storage 30D is constituted with a memory device such as a hard disk drive (HDD), a solid state drive (SSD) or the like. The storage 30D stores various programs and various kinds of data. In the present exemplary embodiment, an autonomous driving control program for controlling autonomous running of the driver 22 in accordance with vicinity information detected by the vicinity information detection sensors 32 is stored in the ROM 30B or storage 30D. Map information and the like is memorized in the storage 30D. The communications interface 30E is an interface for the control device 30 to communicate with other equipment.

The input/output interface 30F is an interface for communicating with various devices mounted at the tractor 20. Via the input/output interface 30F, the control device 30 according to the present exemplary embodiment is connected with, for example, a control unit 23 of the driver 22, the vicinity information detection sensors 32, the GPS device 34, the vehicle state sensors 36, and a release actuator 42 of the coupler 40.

The driver 22 includes the control unit 23, a motor 24, a steering device 25 and the driving wheels 26 (see FIG. 1 and the like). The control unit 23 is a device that controls the motor 24 and the steering device 25 in response to command signals from the control device 30. The motor 24 transmits driving force to the driving wheels 26. The steering device 25 changes a steering angle of the driving wheels 26.

The tractor 20 according to the present exemplary embodiment runs by operation of the driver 22, and autonomous running of the tractor 20 is controlled by the control device 30. That is, as a functional structure, the control device 30 includes a controller 301 shown in FIG. 3B. The controller 301 controls autonomous running of the driver 22 in accordance with vicinity information detected by the vicinity information detection sensors 32. This functional structure is realized by the CPU 30A shown in FIG. 3A loading and executing the autonomous driving control program memorized at the ROM 30B or storage 30D.

The vicinity information detection sensors 32 are a sensor group for gathering information about the surroundings of the tractor 20. The vicinity information detection sensors 32 include, for example, a camera that images vicinity information of the tractor 20. The vicinity information detection sensors 32 may also include at least one of, for example, a millimeter wave radar that transmits scanning waves in a predetermined range and receives reflected waves and a lidar (laser imaging detection and ranging) that scans a predetermined range.

The GPS device 34 is a device that measures a current position of the tractor 20. The GPS device 34 includes an antenna that receives signals from GPS satellites. The vehicle state sensors 36 acquire information representing running states and operation states of the tractor 20. The vehicle state sensors 36 include, for example, a steering sensor that detects steering angles of the tractor 20 and a speed sensor that detects running speeds of the tractor 20.

As shown in FIG. 2, the coupler 40 is provided at a rear portion of the vehicle main body 28 of the tractor 20. The coupler 40 serves as a first coupler that can be coupled with the trailer 50. The coupler 40 is provided with a coupler main body 40A, a knuckle 40B and a locking pin 40C. In plan view, the coupler main body 40A is formed in a substantial "U" shape that opens to a vehicle outer side. The knuckle 40B is provided at a protruding side of the coupler 40 at one of left or right. The knuckle 40B is attached to be turnable about a knuckle pin 40P that is in the vehicle vertical direction. The locking pin 40C is connected to a lock that locks the knuckle 40B in a closed state. The basic structure of the coupler 40 is similar to widely known railway couplers in, for example, Japanese Patent No. 5,837, 668 and the like. Accordingly, the basic structure of the coupler 40 is not described in detail here.

A coupler 52 with a similar structure to the coupler 40 (see FIG. 2) is provided at a lower front face side of the trailer 50 shown in FIG. 1. That is, the coupler 52 is equipped with a coupler main body 52A, a knuckle 52B and a locking pin 52C (which are shown simplified in the drawings). The coupler 52 constitutes a second coupler that can be coupled to the coupler 40 (see FIG. 2). When the tractor 20 and the trailer 50 are to be coupled, the couplers 40 and 52 are aligned with one another and pushed together in a state in which the knuckle 52B and the knuckle 40B shown in FIG. 2 are in respective open states. Accordingly, the knuckles 40B and 52B turn in closing directions thereof and the couplers 40 and 52 are automatically coupled with one another.

As an example, the coupler 40 is in a condition in which most of the coupler main body 40A is accommodated in a recess portion 28A formed in the vehicle main body 28. Similarly, the coupler 52 shown in FIG. 1 is in a condition in which most of the coupler main body 52A is accommodated in a recess portion 54A formed in the trailer 50.

The lock of the locking pin 40C shown in FIG. 2 may be displaced to a lock release position by the release actuator 42 illustrated in FIG. 3A. To add to this description, when a command to open the knuckle 40B of the coupler 40 is transmitted from the portable device 100 of the user P shown in FIG. 1 and the communications interface 30E shown in FIG. 3A receives this command, the control device 30 is configured to give an operation command to the release actuator 42, and the release actuator 42 operates.

The lock of the locking pin 52C shown in FIG. 1 may be displaced to a lock release position by a release actuator provided at the trailer 50. The release actuator provided at the trailer 50 is configured to be operated by, for example, a command inputted from a user interface provided at the trailer 50.

As shown in FIG. 1, the trailer 50 is equipped with a power supply connector 62. A power supplier 60 (see FIG. 5) that includes the power supply connector 62 is described below. The trailer 50 is equipped with a protrusion portion 54B that protrudes to the vehicle front side, at the upper side of the coupler 52 at the lower front face side. The power supply connector 62 is provided at a front end portion of the protrusion portion 54B.

As shown in FIG. 2, a recess portion 28B that is recessed to the vehicle front side is formed at the upper side of the coupler 40, at an upper portion of the rear face side of the vehicle main body 28 of the tractor 20. A power receiving connector 44 is provided at a recess floor side of the recess portion 28B. In a state shown in FIG. 4 and FIG. 5 in which the tractor 20 is coupled to the trailer 50, the protrusion portion 54B of the trailer 50 (see FIG. 1) is inserted into the recess portion 28B of the tractor 20 (see FIG. 2). FIG. 6 shows the state in which the protrusion portion 54B of the trailer 50 is inserted into the recess portion 28B of the tractor 20, in a simplified side sectional diagram.

As shown in FIG. 6, in the state in which the tractor 20 is coupled to the trailer 50, the power receiving connector 44 is connected with the power supply connector 62. Thus, the driver 22 is capable of using electric power supplied from the power supplier 60 via the power receiving connector 44 for running.

Figure 4:
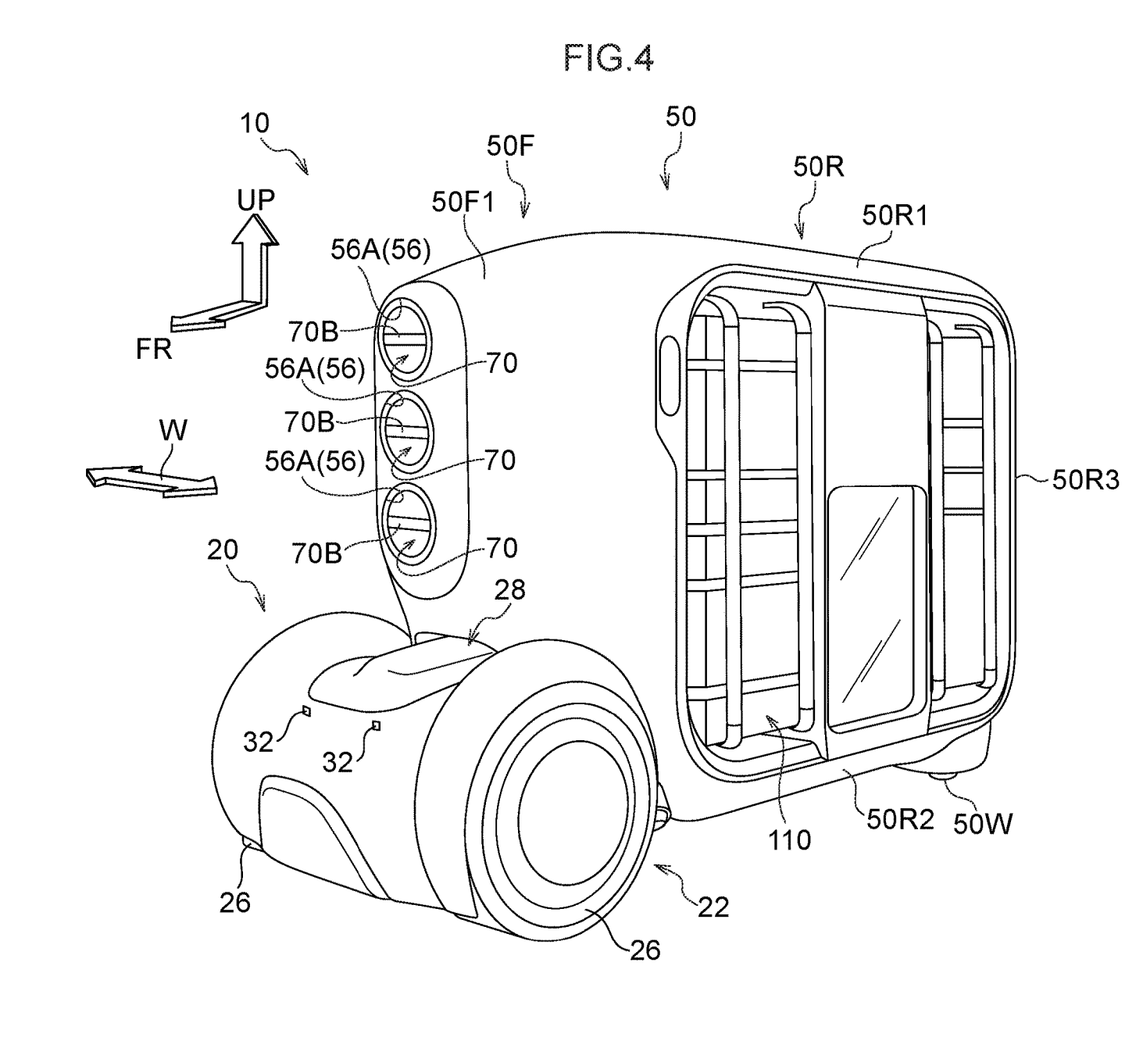
FIG. 4 is a perspective view, seen from the diagonal forward side, showing a vehicle in which the exemplary tractor and trailer in FIG. 1 are coupled.
Figure 5:
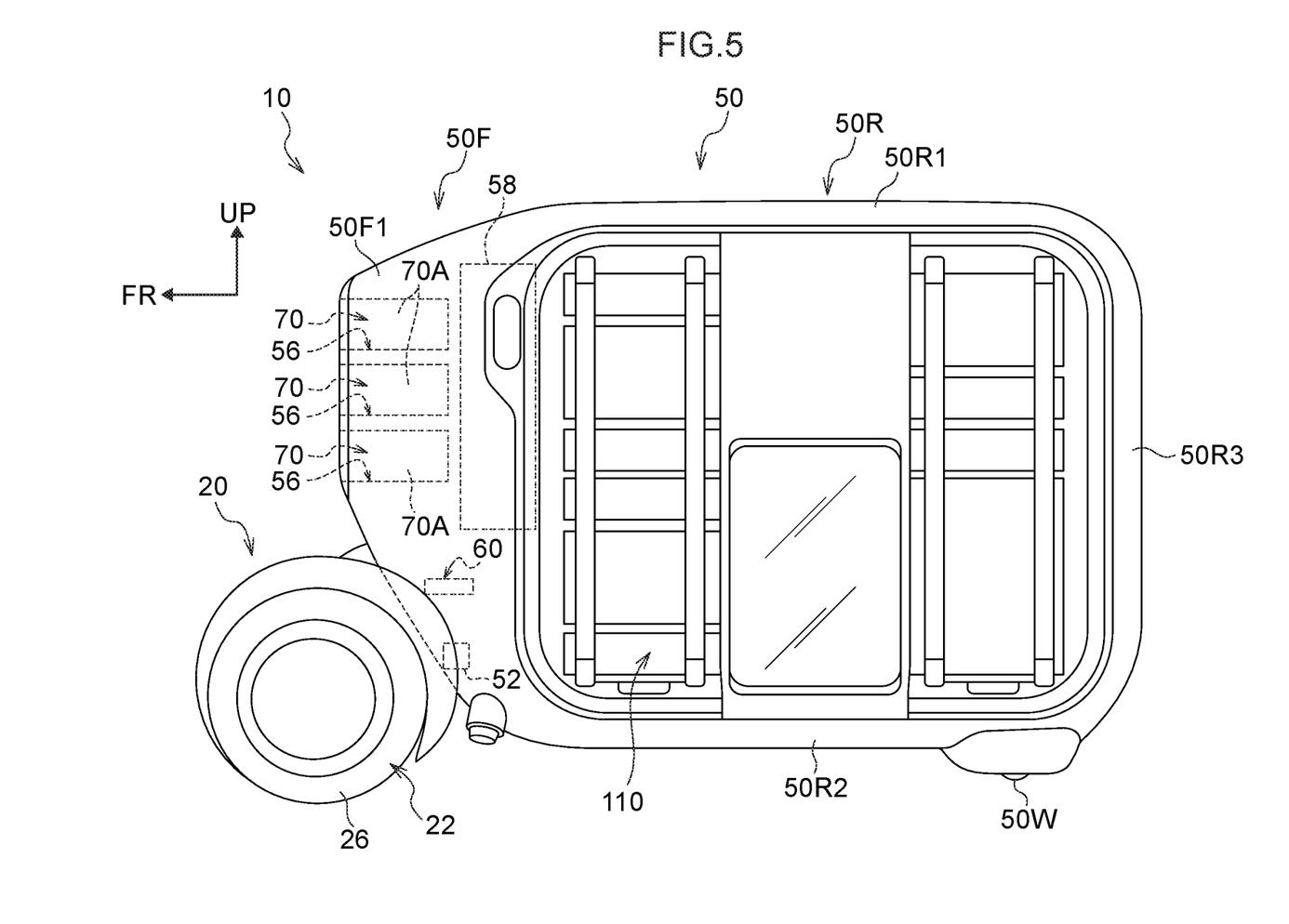
FIG. 5 is a side view, seen from sideward from the left side, showing the exemplary vehicle in FIG. 4.
Figure 6:
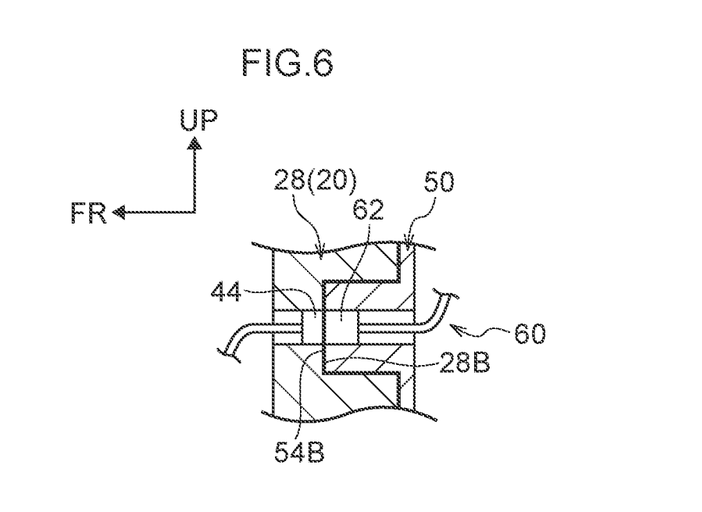
FIG. 6 is a simplified side sectional diagram showing a state in which a protrusion portion at a lower front face side of the exemplary trailer shown in FIG. 1 is inserted into a recess portion at a rear face side of a vehicle main body of the exemplary tractor shown in FIG. 2.

As shown in FIG. 4 and FIG. 5, the trailer 50 includes an accommodation space former 50R that forms an accommodation space at the rear side of a vehicle front portion 50F. An outer profile portion 50F1 that forms an outer profile of the vehicle front portion 50F extends in the vehicle vertical direction. As shown in FIG. 1, both of vehicle width direction end portions of a front side lower portion of the outer profile portion 50F1 of the vehicle front portion 50F are angled to the vehicle rear side towards the vehicle lower side, and the front face side of the front side lower portion is recessed toward the vehicle rear side relative to the two vehicle width direction end portions.

As shown in FIG. 4 and FIG. 5, the accommodation space former 50R is provided continuously to the rear side of the vehicle front portion 50F and, together with the outer profile portion 50F1 of the vehicle front portion 50F, forms a frame shape in side view and forms an accommodation space thereinside. To add to this description, the accommodation space former 50R is provided with a roof portion 50R1, a floor portion 50R2 and a rear wall portion 50R3. The roof portion 50R1 extends to the vehicle rear side from an upper end portion of the outer profile portion 50F1 of the vehicle front portion 50F. The floor portion 50R2 extends to the vehicle rear side from a lower end portion of the outer profile portion 50F1 of the vehicle front portion 50F. The rear wall portion 50R3 links a rear end portion of the roof portion 50R1 with a rear end portion of the floor portion 50R2 in the vehicle vertical direction. A load 110 may be placed in the accommodation space former 50R, on the floor portion 50R2. A left and right pair of wheels 50W are provided at the lower side of a rear portion of the floor portion 50R2.

As shown in FIG. 5, tank storage portions 56 are formed in the vehicle front portion 50F at the upper side of the coupler 52. The tank storage portions 56 are capable of storing a plural number (for example, three) of hydrogen tanks 70 in a vertical array. Each tank storage portion 56 extends in the vehicle front-and-rear direction, and an insertion aperture 56A is provided at the front end of the tank storage portion 56 (see FIG. 4). Each hydrogen tank 70 is provided with a tank main body 70A in a cylindrical container shape. A handle 70B, shown in FIG. 4, is formed at one end portion of a length direction of the tank main body 70A. The handle 70B is held by a user when the user is inserting the hydrogen tank 70 through the insertion aperture 56A into the tank storage portion 56 and the like.

In the present exemplary embodiment, the hydrogen tank 70 is structured to be lockable. For example, the handle 70B of the hydrogen tank 70 is gripped by a user and, in a state in which a spanning direction of the handle 70B is in a vertical direction, the hydrogen tank 70 is inserted deep into the tank storage portion 56. Then, when the hydrogen tank 70 is turned 90° about the axis thereof in the vehicle front-and-rear direction such that the spanning direction of the handle 70B becomes a horizontal direction (the direction shown in FIG. 4), the hydrogen tank 70 is locked.

As shown in FIG. 5, a fuel cell 58 is provided in the vehicle front portion 50F at the vehicle rear side of the tank storage portions 56. The fuel cell 58 is connected with the hydrogen tanks 70 and an air compressor. The fuel cell 58 receives a supply of hydrogen from the hydrogen tanks 70 stored in the tank storage portions 56, receives a supply of compressed air containing oxygen from the air compressor, and generates electricity.

The power supplier 60 (depicted as a block in the drawings) is mounted in the vehicle front portion 50F at the lower side of the fuel cell 58. The power supplier 60 supplies electric power from the fuel cell 58 through the power supply connector 62 shown in FIG. 6 to the tractor 20 via the power receiving connector 44.

Operation and Effects

Now, operation and effects of the above exemplary embodiment are described.

As shown in FIG. 1 and FIG. 2, the driver 22 of the tractor 20 according to the present exemplary embodiment is equipped with the left and right pair of driving wheels 26, and the vehicle main body 28 is provided between the left and right pair of driving wheels 26. The vicinity information detection sensors 32 provided at the vehicle main body 28 (see FIG. 1) detect vicinity information. The controller 301 provided in the vehicle main body 28 (see FIG. 3B) controls autonomous running of the driver 22 in accordance with vicinity information detected by the vicinity information detection sensors 32. The coupler 40 provided at the vehicle main body 28 shown in FIG. 2 is coupled to the coupler 52 of the trailer 50 shown in FIG. 1. Accordingly, the tractor 20 that tows the trailer 50 by autonomous running may be compact.

The tractor 20 according to the present exemplary embodiment is employed when the trailer 50 that is to be towed is equipped with the power supplier 60 including the power supply connector 62 (see FIG. 5). The power receiving connector 44 shown in FIG. 2 is provided at the vehicle main body 28 and is connected with the power supply connector 62. The driver 22 is capable of using electric power supplied from the power supplier 60 (see FIG. 5) via the power receiving connector 44 for running. Therefore, the tractor may be more compact than a structure in which an electric power source for running the driver is mounted at the tractor.

As described above, according to the tractor 20 according to the present exemplary embodiment, while employing a compact structure, the tractor 20 may tow the trailer 50 by autonomous running.

As described above, a vehicle 10 according to the present exemplary embodiment that is shown in FIG. 5 and the like is provided with the tractor 20 and the trailer 50. The trailer 50 includes the coupler 52, the tank storage portions 56, the fuel cell 58 and the power supplier 60 at the vehicle front portion 50F, and the trailer 50 includes the accommodation space former 50R at the rear side of the vehicle front portion 50F. According to this structure, electric power is generated in the vehicle front portion 50F of the trailer 50 that is disposed closer to the tractor 20 and may be supplied to the tractor 20, and the load 110 may be placed at the rear side of the vehicle front portion 50F of the trailer 50. As necessary, the tractor 20 may be uncoupled from the trailer 50 and another trailer may be towed by the tractor 20.

Second Exemplary Embodiment

Figure 7:
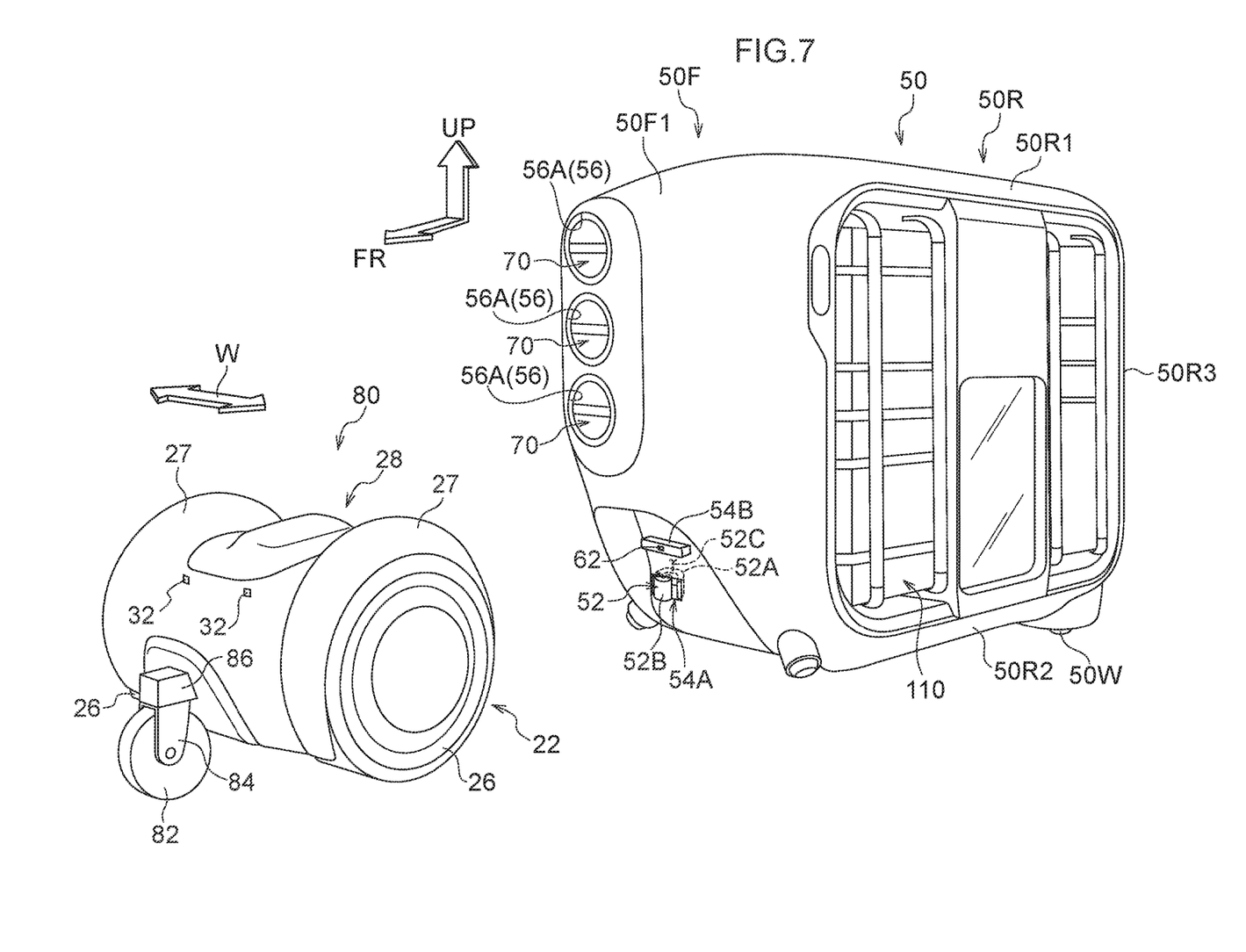
FIG. 7 is a perspective view, seen from the diagonal forward side, showing an exemplary tractor according to a second exemplary embodiment of the present disclosure and a trailer to be towed by the tractor, in a state in which the tractor and trailer are uncoupled.

Now, a second exemplary embodiment of the present disclosure is described using FIG. 7. FIG. 7 is a perspective view, seen from the diagonal forward side, showing a tractor 80 according to the second exemplary embodiment and the trailer 50, which is to be towed by the tractor 80, in a state in which the tractor 80 and trailer 50 are uncoupled. As shown in FIG. 7, the tractor 80 according to the present exemplary embodiment differs from the tractor 20 according to the first exemplary embodiment (see FIG. 1) in that a wheel 82, which is smaller than the driving wheels 26, is provided at the front side in the vehicle front-and-rear direction of the vehicle main body 28. Other structures are the same as in the first exemplary embodiment except in the respects described below. Structural portions that are the same as in the first exemplary embodiment are assigned the same reference symbols and are not described here.

As shown in FIG. 7, the wheel 82 is disposed at a vehicle width direction central portion of the front side in the vehicle front-and-rear direction of the vehicle main body 28. The wheel 82 is turnably supported by a bracket 84. A support portion 86 protrudes from the vehicle width direction central portion at the front side in the vehicle front-and-rear direction of the vehicle main body 28. The bracket 84 is turnable relative to the support portion 86 about an axis in the vehicle vertical direction.

According to the present exemplary embodiment, the same operation and effects as in the first exemplary embodiment described above may be provided, in addition to which running of the tractor 80 may be made more stable.

Supplementary Descriptions of the Exemplary Embodiments

In the first and second exemplary embodiments described above, structures are described in which the trailer 50 shown in FIG. 1 and FIG. 7 is equipped with the power supplier 60 including the power supply connector 62 (see FIG. 5). However, structures are possible in which a trailer is not equipped with a power supplier and a tractor may be run by electric power from a power source mounted at the tractor.

In the first and second exemplary embodiments described above, the coupler 40 (see FIG. 2) is employed as the first coupler and the coupler 52 is employed as the second coupler. However, alternative coupling structures including fittings and the like may be employed for the first coupler and the second coupler.

In the second exemplary embodiment described above, the wheel 82 that is smaller than the driving wheels 26 is provided at the front side in the vehicle front-and-rear direction of the vehicle main body 28. As a variant example, instead of the wheel 82, a wheel that is smaller than the driving wheels (26) may be provided at the rear side in the vehicle front-and-rear direction of the vehicle main body (28).

The exemplary embodiments described above and variant examples mentioned above may be embodied in suitable combinations.

Above, illustrative examples of the present disclosure are described, but the present disclosure is not limited by these descriptions; numerous modifications beyond these descriptions may be embodied within a technical scope not departing from the gist of the disclosure.

The present disclosure provides a tractor that, while employing a compact structure, may tow a trailer by autonomous running, and provides a vehicle equipped with the tractor.

A first aspect of the present disclosure is a tractor that includes: a driver equipped with a left and right pair of driving wheels; a vehicle main body provided between the left and right pair of driving wheels; a periphery information detection sensor provided at the vehicle main body and detecting periphery information; a controller provided in the vehicle main body and controlling autonomous traveling by the driver in accordance with the periphery information detected by the periphery information detection sensor; and a first coupler provided at the vehicle main body and configured to be coupled to a trailer.

According to the first aspect, the driver is equipped with the left and right pair of driving wheels, and the vehicle main body is provided between the left and right pair of driving wheels. The vicinity information detection sensor provided at the vehicle main body detects vicinity information. The controller provided in the vehicle main body controls autonomous driving of the driver in accordance with the vicinity information detected by the vicinity information detection sensor. The first coupler provided at the vehicle main body can be coupled to a trailer. Accordingly, a tractor that tows a trailer by autonomous running may become more compact.

A second aspect of the present disclosure is the tractor of the first aspect, that further includes a power supplier including a power supply connector, wherein the vehicle main body has a power receiving connector coupled to the power supply connector, and the driver is configured to be capable of driving by the driver using electric power supplied from the power supplier via the power receiving connector.

According to the second aspect, if a trailer is equipped with the power supplier including the power supply connector, the power receiving connector that can be connected with the power supply connector is provided at the vehicle main body, and the driver is configured to be capable of using electric power supplied from the power supplier via the power receiving connector for running of the driver. Therefore, the tractor may be more compact than a structure in which an electric power source for running the driver is mounted at the tractor.

A third aspect of the present disclosure is the tractor of the first aspect or the second aspect that further includes, at one of a front side or a rear side in a vehicle front-and-rear direction of the vehicle main body, a wheel that is smaller than the driving wheels.

According to the third aspect, running of the tractor may be made more stable by the wheel provided at the front side or rear side in the vehicle front-and-rear direction of the vehicle main body.

A fourth aspect of the present disclosure is a vehicle that includes: the tractor of the second aspect; and the trailer, the trailer including, at a vehicle front portion: a second coupler configured to be coupled to the first coupler, a plurality of tank storages at an upper side of the second coupler, the plurality of tank storages being capable of storing a plurality of hydrogen tanks in a vertical array, a fuel cell receiving a supply of hydrogen from the hydrogen tanks stored in the tank storages and generating electric power, and the power supplier, the power supplier supplying electric power from the fuel cell through the power supply connector to the tractor via the power receiving connector, wherein the trailer further includes an accommodation space former forming an accommodation space at a rear side of the vehicle front portion.

According to the fourth aspect, the tractor may be compact, electric power may be generated in the vehicle front portion of the trailer, which is disposed closer to the tractor, and the electric power may be supplied to the tractor. Moreover, a load may be placed at the rear side of the vehicle front portion of the trailer. As necessary, the tractor may be uncoupled from the trailer and another trailer may be towed by the tractor.

According to the present disclosure, while employing a compact structure, a tractor may tow a trailer by autonomous running.

What is claimed is:

1. A tractor comprising:
 a driver equipped with a left and right pair of driving wheels;
 a vehicle main body provided between the left and right pair of driving wheels, the vehicle main body including a recess portion providing a power receiving connector configured to be coupled to a power supply connector of a power supplier, and the driver is configured to be capable of driving by the driver using electric power supplied from the power supplier via the power receiving connector;

a periphery information detection sensor provided at the vehicle main body and detecting periphery information;

a controller provided in the vehicle main body and controlling autonomous traveling by the driver in accordance with the periphery information detected by the periphery information detection sensor; and a first coupler provided at the vehicle main body and configured to be coupled to a trailer, the first coupler comprising a coupler main body and a knuckle rotatably connected to the coupler main body between an open state and a closed state.

2. The tractor according to claim 1, further comprising, at one of a front side or a rear side in a vehicle front-and-rear direction of the vehicle main body, a wheel that is smaller than the driving wheels.

3. The tractor according to claim 1, wherein the tractor is a substantially circular cylinder, both end faces of which respectively correspond to each of the driving wheels.

4. A vehicle comprising:
the tractor according to claim 1; and
the trailer, the trailer including, at a vehicle front portion:
a second coupler configured to be coupled to the first coupler,
a plurality of tank storages at an upper side of the second coupler, the plurality of tank storages being capable of storing a plurality of hydrogen tanks in a vertical array,
a fuel cell receiving a supply of hydrogen from the hydrogen tanks stored in the tank storages and generating electric power, and
the power supplier, the power supplier supplying electric power from the fuel cell through the power supply connector to the tractor via the power receiving connector, wherein the trailer further includes an accommodation space former forming an accommodation space at a rear side of the vehicle front portion.

5. The vehicle according to claim 4, wherein the plurality of tank storages extend in a vehicle front-and-rear direction and include insertion apertures at front ends thereof.

6. The tractor according to claim 1, wherein the coupler main body has a U-shape configuration.

7. The tractor according to claim 1, wherein the first coupler further comprises a lock pin that retains the knuckle in the closed state.

8. The vehicle according to claim 4, wherein the trailer includes a protrusion portion providing the power supply connector, the protrusion disposed within the recess portion and connecting the power supply connector with the power receiving connector.

* * * * *